United States Patent
Suzuki et al.

(10) Patent No.: US 10,399,576 B2
(45) Date of Patent: Sep. 3, 2019

(54) METHOD FOR CONVEYING INFORMATION DURING AN AUTONOMOUS DRIVE AND VEHICULAR INFORMATION PRESENTING DEVICE

(71) Applicant: YAZAKI CORPORATION, Tokyo (JP)

(72) Inventors: Yukio Suzuki, Shizouka (JP); Kenichi Nagahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/157,352

(22) Filed: Oct. 11, 2018

(65) Prior Publication Data

US 2019/0111943 A1    Apr. 18, 2019

(30) Foreign Application Priority Data

Oct. 12, 2017    (JP) ................. 2017-198810

(51) Int. Cl.
*B60W 50/14* (2012.01)
*B60W 10/20* (2006.01)
(Continued)

(52) U.S. Cl.
CPC ............ *B60W 50/14* (2013.01); *B60W 10/04* (2013.01); *B60W 10/18* (2013.01); *B60W 10/20* (2013.01); *B60W 2050/0071* (2013.01); *B60W 2050/143* (2013.01); *B60W 2050/146* (2013.01); *B60W 2420/42* (2013.01); *B60W 2550/306* (2013.01);
(Continued)

(58) Field of Classification Search
CPC ....... B60W 50/14–16; B60W 2540/22; B60W 2540/26; B60W 50/0097; B60W 2040/0872; B60W 2050/0072; G05D 1/0061; G05D 1/0055; B60K 2370/175;
(Continued)

(56) References Cited

U.S. PATENT DOCUMENTS 8,606,455 B2 * 12/2013 Boehringer ........... B60W 30/17
                                                         701/23
8,670,891 B1 * 3/2014 Szybalski ............. B62D 1/286
                                                         701/23
(Continued)

FOREIGN PATENT DOCUMENTS

JP    2016-182906 A    10/2016
JP    2017-26417 A     2/2017

*Primary Examiner* — Eric Blount
(74) *Attorney, Agent, or Firm* — Kenealy Vaidya LLP

(57) ABSTRACT

Until a lapse of a prescribed time from switching to a manual drive mode, a special judgment criterion for judging whether to generate an attention-arousing event is employed so that an attention-arousing event is generated more frequently than in an ordinary state and information is presented to a driver in a different expression form than in the ordinary situation. Since after occurrence of a handover the frequency of arousing attention of the driver is increased and attention of the driver is aroused in a different form, the driver realizes the switching to the manual drive mode soon and hence mode confusion can be avoided. Arousing attention of the driver is started earlier than in the ordinary situation by changing the judgment criterion for judging whether to generate an attention-arousing event.

6 Claims, 9 Drawing Sheets

(51) Int. Cl.
*B60W 10/18* (2012.01)
*B60W 10/04* (2006.01)
*B60W 50/00* (2006.01)
*G05D 1/00* (2006.01)

(52) U.S. Cl.
CPC . *B60W 2550/308* (2013.01); *B60W 2550/406* (2013.01); *B60W 2710/18* (2013.01); *B60W 2710/20* (2013.01); *B60W 2710/30* (2013.01); *B60W 2720/10* (2013.01); *G05D 1/0088* (2013.01)

(58) Field of Classification Search
CPC ...... B60K 2370/172; B60K 2370/1868; G06K 9/00845
USPC .......................................... 340/438, 575, 576
See application file for complete search history.

(56) References Cited

U.S. PATENT DOCUMENTS

| | | | | |
|---|---|---|---|---|
| 8,818,608 B2* | 8/2014 | Cullinane | ............. | B60W 30/00 701/23 |
| 9,365,213 B2* | 6/2016 | Stenneth | ............. | B60W 30/00 |
| 9,849,832 B2* | 12/2017 | Mori | ............. | B60Q 9/00 |
| 2016/0041553 A1* | 2/2016 | Sato | ............. | B60W 30/143 701/23 |
| 2016/0107655 A1* | 4/2016 | Desnoyer | ............. | B60W 50/14 701/23 |
| 2016/0231743 A1* | 8/2016 | Bendewald | ....... | B60W 50/0097 |
| 2016/0355192 A1* | 12/2016 | James | ............. | B60W 50/082 |
| 2017/0021765 A1 | 1/2017 | Mori et al. | | |
| 2017/0136878 A1* | 5/2017 | Frank | ............. | B60W 50/14 |
| 2017/0225567 A1* | 8/2017 | Tsuda | ............. | B60K 35/00 |
| 2017/0329329 A1* | 11/2017 | Kamhi | ............. | B60W 50/14 |
| 2017/0368936 A1* | 12/2017 | Kojima | ............. | B60K 28/06 |
| 2018/0065552 A1 | 3/2018 | Mori et al. | | |

* cited by examiner

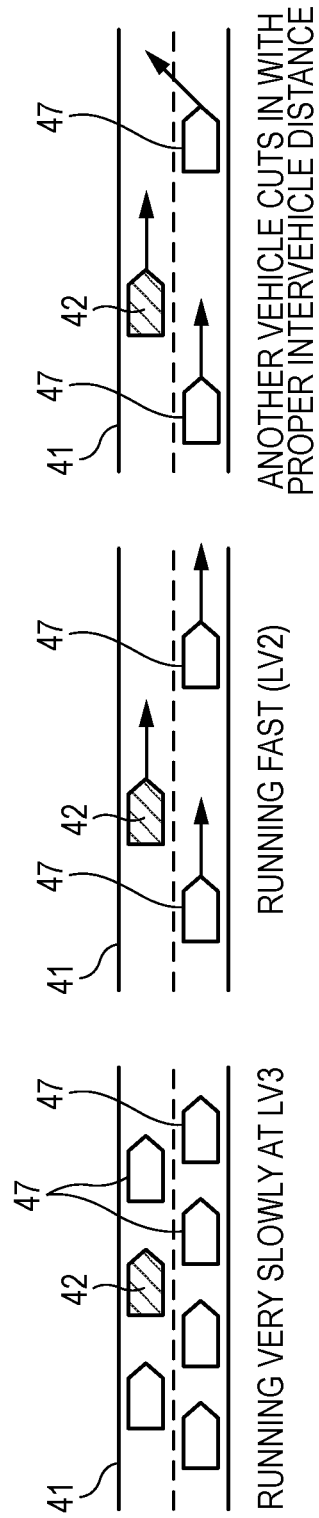

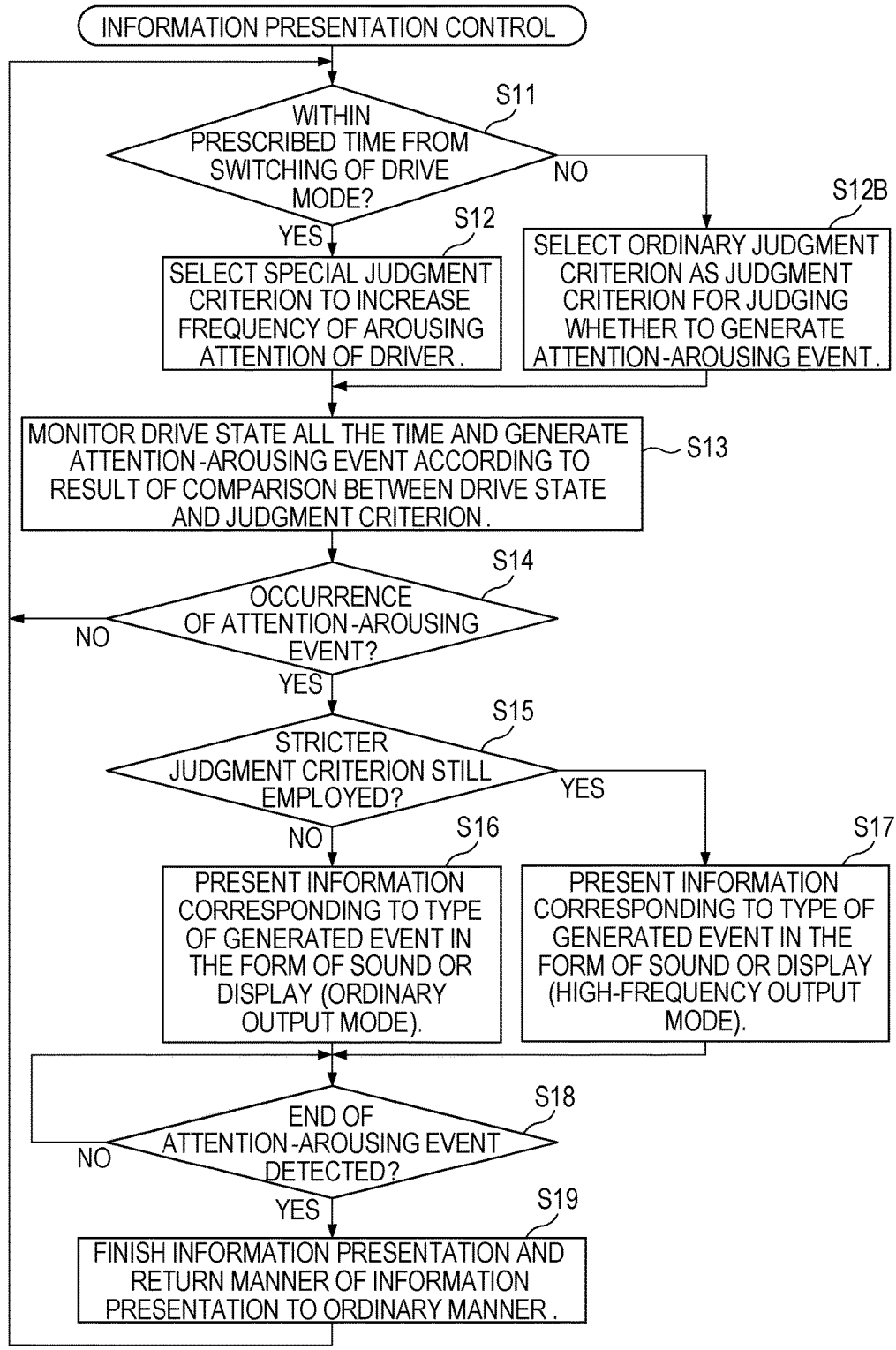

LANE KEEPING FUNCTION IS EFFECTIVE,
ORDINARY RUNNING

STRONG ATTENTION-AROUSING MESSAGE
PLUS ATTENTION-AROUSING SOUND

METHOD FOR CONVEYING INFORMATION DURING AN AUTONOMOUS DRIVE AND VEHICULAR INFORMATION PRESENTING DEVICE

CROSS REFERENCE TO RELATED APPLICATIONS

This application is based on and claims priority from Japanese patent application No. 2017-198810 filed on Oct. 12, 2017, the entire contents of which are incorporated herein by reference.

BACKGROUND OF THE INVENTION

1. Technical Field

The present invention relates to a method for conveying information during an autonomous drive and a vehicular information presenting device that can be employed in vehicles capable of autonomous driving.

2. Background Art

Automobile manufacturers are now developing technologies for automatizing part of drive manipulations and autonomous drive technologies for allowing a system including a computer to perform almost all drive manipulations automatically in place of a driver (refer to Patent documents JP-A-2016-182906 and JP-A-2017-26417, for example).

Patent document JP-A-2016-182906, which relates to a drive assist system, discloses a technique for allowing the driver to recognize a surrounding traffic situation quickly when an autonomous drive is canceled. More specifically, when receiving a notice or an advance notice of switching from an autonomous drive to a manual drive, the system displays, on the display provided in a meter cluster panel, a vehicle speed of the self vehicle, a rear-view video, an image indicating a front road shape, an image indicating locations of vehicles around the self vehicle, and an image indicating a distance to the vehicle immediately ahead and a situation around it.

Patent document JP-A-2017-26417, which relates to an information presenting system, discloses a technique for presenting information recognized by an autonomous driving system to the driver in response to his or her instruction. More specifically, the information presenting system switches the display mode of a display unit in response to a display switching instruction from the driver. The information presenting system has a display mode in which to display set information of an autonomous drive, a display mode in which to display running information during operation of the autonomous driving system, and a display mode in which to display recognition result information of the autonomous driving system.

SUMMARY

Incidentally, while a vehicle in which an autonomous driving system is installed is doing an autonomous drive, it may encounter a situation that the system cannot deal with properly. In such a situation, it is expected that the drive of the vehicle is continued according to judgments and drive manipulations of the driver by switching, for example, from an autonomous drive mode to a manual drive mode (a handover from the system to the driver) or, if it is impossible, the vehicle is stopped automatically. Alternatively, switching may be made from an autonomous drive mode in which no assistance from the driver is necessary at all to an autonomous drive mode in which assistance from the driver is necessary.

For example, at level-3 (LV3) among the automation levels prescribed by the Japanese government or the National Highway Traffic Safety Administration (NHTSA) of the U.S. Department of Transportation, since a system controls all of acceleration, steering, and braking of a vehicle, usually the driver is required to merely watch the drive situation or even need not watch the drive situation. However, even at level-3, the driver needs to respond to a request from the system in the event of emergency or the system's reaching a limit of control.

That is, in the event of emergency or the system's reaching a limit of control, the responsibility of driving and other things are handed over from the system to the driver and a transition is made from level-3 to level-2 (LV2) which is lower in the degree of automation than level-3.

Even in other operation modes such as at level-2, autonomous running at a certain level is possible by utilizing an automation function such as an ACC (adaptive cruise control system) or a lane keeping assist system. Where the lane keeping assist system is utilized, it is possible to, for example, control the steering system automatically so that the self vehicle runs at the center of a running lane of a road. Where the ACC function is utilized, it is possible to, for example, perform acceleration and deceleration automatically so that the intervehicle distance between the self vehicle and the vehicle immediately ahead is kept in a safe range.

As seen from the above, there occur no large differences in apparent operations of the vehicle even if a transition is made from level-3 to level-2 in the autonomous drive level. However, whereas at level-3 the system performs a drive control so as to take full responsibility unless a limit of control is reached, at level-2 it is highly probable that the system merely performs auxiliary drive controls. Thus, at level-2, for example, the vehicle may not be able to succeed in running along a curved road having a large curvature unless the driver adjusts the running speed and/or manipulates the steering wheel properly.

When the autonomous drive mode is changed as exemplified by an autonomous drive mode level transition from level-3 to level-2 through an actual handover (with approval of a system request by the driver), a mode confusion may occur because usually no large differences occur in the state of the self vehicle as recognized by the driver. That is, the driver may misunderstand as if the vehicle were running in the level-3 autonomous drive mode though in actuality the autonomous drive mode has already been switched to the level-2 drive mode that is lower in the degree of automation.

For example, this may result in an event that in the level-2 drive mode the self vehicle cannot follow a running lane of a curved road having a large curvature and leaves it because the driver does not manipulate the steering wheel due to mode confusion, whereas the vehicle could follow it without any problems in the level-3 autonomous drive mode.

The present invention has been made in view of the above circumstances, and an object of the invention is therefore to provide a method for conveying information during an autonomous drive and a vehicular information presenting device that are useful for preventing an event that is not expected by a driver from occurring due to his or her misunderstanding of a drive control state when switching is made from a first state in which a drive control is performed automatically to a second state that is higher in the degree of involvement of the driver in drive control than the first state.

To attain the above object, the invention provides methods for conveying information during an autonomous drive and vehicular information presenting devices having features that will be described below in the form of items (1) to (6):

(1) A method for conveying information during an autonomous drive which presents information to a driver in a vehicle having, as running states, two or more states that are different from each other in the degree of involvement of the driver in drive control, wherein:

the running states include a first state in which the drive control is performed automatically and a second state that is higher in the degree of involvement of the driver in drive control than the first state;

when switching is made from the first state to the second state, the frequency of arousing attention of the driver is increased by changing a judgment criterion for detecting an event that necessitates arousing attention of the driver until a prescribed condition is satisfied; and when the event is detected, attention-arousing information is conveyed to the driver using an output device that stimulates at least one of the five senses of the driver.

In the method for conveying information during an autonomous drive of item (1), the frequency of arousing attention of the driver is made higher than in an ordinary situation until the prescribed condition is satisfied, for example, until a lapse of a prescribed time, the vehicle runs a prescribed distance, or the information is presented a prescribed number of times, from switching from the first state in which the drive control is performed automatically to the second state that is higher in the degree of involvement of the driver than the first state. Thus, attention-aroused frequently, the driver should recognize that switching has already been made to the second state because the situation is different than in the previous state (first state). As a result, the driver can be prevented from misunderstanding the drive control state. Furthermore, since the frequency of arousing attention of the driver is higher than in the ordinary situation until a lapse of the prescribed time from the switching to the second state, the driver is caused to drive more safely than in the ordinary situation, whereby a safe drive state is established in which an unexpected event such as deviation from a running lane is hard to occur.

(2) The method for conveying information during an autonomous drive according to item (1), wherein the output form of the attention-arousing information that is conveyed to the driver upon detection of the event is switched between a first output form to be employed before the frequency of arousing attention of the driver is increased and a second output form to be employed after the frequency of arousing attention of the driver is increased.

In the method for conveying information during an autonomous drive of item (2), since the attention-arousing information is output in a different output form than in the previous state (first state) until the prescribed condition is satisfied, the driver should recognize, more reliably, that the running state has already been switched to the second state.

(3) The method for conveying information during an autonomous drive according to item (2), wherein the attention-arousing information is conveyed to the driver with earlier timing in the second output form than in the first output form.

In the method for conveying information during an autonomous drive of item (3), since the attention-arousing information is conveyed to the driver with earlier timing until the prescribed condition is satisfied from the switching from the first state to the second state, the driver is caused to recognize, with earlier timing, an event to which he or she should pay attention and hence can attend to the event safely with a proper time margin.

(4) The method for conveying information during an autonomous drive according to item (2), wherein the second output form is such that an explicit message is output in addition to attention-arousing information that is output in the first output form.

In the method for conveying information during an autonomous drive of item (4), since an explicit message is output until the prescribed condition is satisfied from the switching from the first state to the second state, the driver should recognize, more reliably, that the running state has already been switched to the second state.

(5) The method for conveying information during an autonomous drive according to item (2), wherein attention-arousing information that is output in the second output form is an emphasized version of attention-arousing information that is output in the first output form.

In the method for conveying information during an autonomous drive of item (5), since the attention-arousing information is output in a more emphasized manner than in the ordinary situation until the prescribed condition is satisfied from the switching from the first state to the second state, the driver can recognize, more reliably, that the drive mode has already been switched to the manual drive mode. Furthermore, since the attention-arousing information is output in a more emphasized manner, the driver is caused to drive more safely in connection with what attention should be paid to than in the ordinary situation.

(6) A vehicular information presenting device for presenting information to a driver in a vehicle having, as running states, two or more states that are different from each other in the degree of involvement of the driver in drive control, wherein:

the running states include a first state in which the drive control is performed automatically and a second state that is higher in the degree of involvement of the driver in drive control than the first state; and the vehicular information presenting device comprises an information output control unit which outputs information relating to an event that necessitates arousing of attention of the driver, the vehicular information presenting device increasing the frequency of arousing attention of the driver by changing a judgment criterion for detecting an event that necessitates arousing attention of the driver until a prescribed condition is satisfied, when switching is made from the first state to the second state; and conveying attention-arousing information to the driver using an output device that stimulates at least one of the five senses of the driver, when the event is detected.

In the vehicular information presenting device having the configuration of item (6), the frequency of arousing attention of the driver is made higher than in an ordinary situation until the prescribed condition is satisfied, for example, until a lapse of a prescribed time, the vehicle runs a prescribed distance, or the information is presented a prescribed number of times, from switching from the first state to the second state. Thus, attention-aroused frequently, the driver should recognize that switching has already been made to the second state because the situation is different than in the previous state (first state). As a result, occurrence of mode confusion can be avoided. Furthermore, since the frequency of arousing attention of the driver is higher than in the ordinary situation until the prescribed condition is satisfied from the switching to the second state, the driver is caused to drive more safely than in the ordinary situation, whereby a safe drive state is established in which an unexpected event such as deviation from a running lane is hard to occur.

The method for conveying information during an autonomous drive and the vehicular information presenting device according to the invention can prevent occurrence of an event that is not expected by a driver when switching is made from a first state in which a drive control is performed automatically to a second state that is higher in the degree of involvement of the driver in drive control than the first state because the driver is prevented from misunderstanding a drive control state until establishment of a prescribed condition.

The invention has been described above concisely. The details of the invention will become more apparent when the modes for carrying out the invention (hereinafter referred to as an embodiment) described below are read through with reference to the accompanying drawings.

BRIEF DESCRIPTION OF THE DRAWINGS

FIGS. 2A-2C are plan views showing specific example relationships between a self vehicle and other vehicles running on a road.

FIG. 4 is a flowchart showing an example process characteristic of the vehicular system as an implementation of the invention.

DETAILED DESCRIPTION OF EMBODIMENTS

Figure 1A:
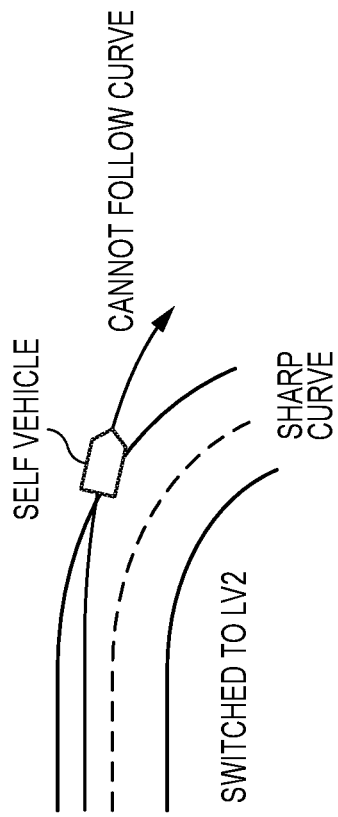
FIGS. 1A and 1B are plan views showing example relationships between a sharp curved road and a vehicle running path.

A method for conveying information during an autonomous drive and a vehicular information presenting device according to a specific embodiment of the present invention will be hereinafter described with reference to the drawings.
<Outline of Method for Conveying Information During Autonomous Drive>

First, an environment to which the method for conveying information during an autonomous drive is applied will be described.
<Autonomous Drive Mode>

At present, vehicles capable of autonomous driving have functions for performing an autonomous drive of automation levels level-2 (LV2) and level-3 (LV3) that are prescribed by, for example, the Japanese government or the National Highway Traffic Safety Administration (NHTSA) of the U.S. Department of Transportation At level-2, the system automatically performs manipulations of plural ones of acceleration, steering, and braking of a vehicle. However, at level-2, the driver needs to watch the drive situation all the time and perform a drive manipulation when necessary.

On the other hand, at level-3, since the system controls all of acceleration, steering, and braking of the vehicle, usually the driver is required to merely watch the drive situation or even need not watch the drive situation. However, even at level-3, the driver needs to respond to a request from the system in the event of emergency or the system's reaching a limit of control. That is, it is necessary to hand over (H/O) the responsibility of driving from the system to the manual manipulation by the driver and to make a transition from level-3 to level-2 or the like which is lower in the degree of automation than level-3. Even where the automation level is kept the same, a transition may be made from a running state in which assistance from the driver such as placing his or her hands on the steering wheel, assuming a duty to watch, starting of a lane change beginning with a blinker manipulation, and approval of a judgment of the system is not necessary during an autonomous drive of the self vehicle to a running state in which one or some of those kinds of assistance are necessary. That is, a transition may be made from a first state in which a drive control is performed automatically to a second state that is lower in the degree of involvement of the driver in drive control than the first state.

In the level-2 drive mode, by utilizing the functions of an ACC (adaptive cruise control system) or a lane keeping assist system, it is possible to cause the vehicle to run in a manner that appears not much different than in the level-3 autonomous drive mode.

The lane keeping assist function is to control the self vehicle automatically so that it runs at the center of a running lane of a road. The ACC function is to perform acceleration and deceleration automatically so that the intervehicle distance between the self vehicle and the vehicle immediately ahead is kept in a safe range on the basis of an analysis result of a video taken by a vehicular camera and position and distance information of the vehicle immediately ahead detected by a radar.

However, the lane keeping assist function and the ACC function of the level-2 drive mode are merely functions for assisting driving by the driver and the responsibility of driving rests on the driver when they are used. That is, although ordinarily they enable an autonomous drive without requiring the driver to perform drive manipulations such as acceleration, deceleration, and steering, to secure safety it is necessary for the driver to recognize the situation all the time and perform a drive manipulation if necessary.

However, when a transition is made from the level-3 drive mode to the level-2 drive mode through a handover, since this does not cause no large changes in the situation, in actuality the driver may misunderstand as if the level-3 drive mode were maintained though in actuality the level-2 drive mode has already been started. That is, the driver may be rendered in a mode confusion state in which he or she mistakes the level-3 drive mode for the level-2 drive mode.

In actuality, to cause a handover from level-3 to level-2, it is necessary for the driver to make an approval manipulation in response to a system request. However, a mode confusion as described above can still occur.

Figure 1B:
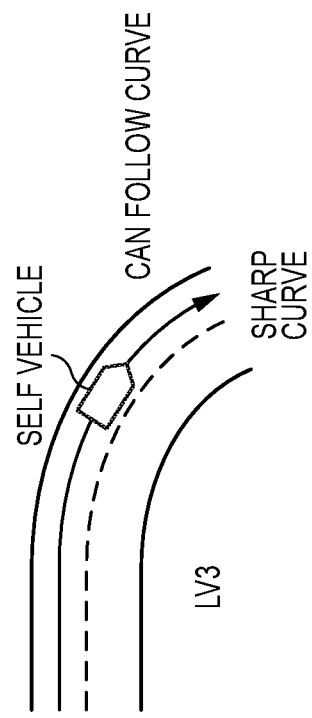

Specific Example-1 of Difference in Drive Result Due to Difference in Drive Mode FIGS. 1A and 1B show example relationships between a sharp curved road and a vehicle running path.

FIG. 1A shows a state that the self vehicle running at level-3 (LV3) of the autonomous drive mode has reached a sharp curved road, and FIG. 1B shows a state that the self vehicle running at level-2 (LV2) of the autonomous drive mode has reached a sharp curved road.

While the self vehicle is running at level-3, though the road is curved sharply, it can run along the road safely as shown in FIG. 1A with only proper drive manipulations of the system, that is, without requiring the driver to perform drive manipulations.

On the other hand, while the self vehicle is running at level-2, it may not be able to follow the sharp curved road successfully as shown in FIG. 1B if the driver does not perform proper drive manipulations.

If the driver drives recognizing that the vehicle is in the level-2 drive mode, the situation shown in FIG. 1B is unlikely to occur. However, if the driver drives misunderstanding as if the current drive mode were of level-3 due to mode confusion, the situation shown in FIG. 1B likely occurs. It is therefore necessary to employ a function for preventing occurrence of mode confusion of the driver.

Specific Example-2 of Difference in Drive Result Due to Difference in Drive Mode FIGS. 2A-2C show specific example relationships between a self vehicle 42 and other vehicles 47 running on a road 41. The examples shown in FIGS. 2A-2C assume a case that the self vehicle 42 is provided with functions that allow the vehicle to employ the level-3 drive mode only when encountering a traffic congestion and to cause the vehicle to run in the level-2 drive mode (i.e., the driver takes responsibility) in other situations.

FIG. 2A shows an example state that the self vehicle 42 is in the level-3 (LV3) autonomous drive mode because it is running on a road 41 very slowly together with many other vehicles 47 due to occurrence of a traffic congestion.

Once the self vehicle 42 and other vehicles 47 around it pass a congested area shown in FIG. 2A, they increase speeds. Having gotten out of the traffic congestion, the self vehicle 42 and other vehicles 47 around it can run fast as in the example state shown in FIG. 2B. Thus, in the self vehicle 42, a drive mode level transition is made from level-3 (LV3) at which the system takes responsibility to level-2 (LV2) at which the driver takes responsibility. Even if the driver approves the transition from level-3 to level-2, conventionally the self vehicle 42 may continue to run with the level of awakeness of the driver remaining low.

When as shown in FIG. 2C another vehicle 47 changes its course to cut in ahead of the self vehicle 42 from the adjoining running lane, conventionally the intervehicle distance between the self vehicle 42 and the other vehicle 47 may become too small to secure safety because the level of awakeness of the driver remains low. Thus, also in the case shown in FIG. 2C, to secure safety, it is necessary to arouse attention of the driver by increasing the level of his or her awakeness by making him or her aware that the self vehicle 47 is running at level-2.

<Outline of Control of Method for Conveying Information During Autonomous Drive>

In the method for conveying information during an autonomous drive according to the invention, when a transition is made from level-3 to level-2, the judgment criterion for arousing attention of the driver is changed to one that is different than in an ordinary situation and a control is made so as to increase the frequency of arousing attention of the driver until a prescribed condition(s) such as a lapse of a prescribed time, having run a prescribed distance, and/or occurrence of a prescribed number of times of information conveyance is satisfied. The prescribed condition(s) may be either one or a combination of the conditions relating to the prescribed time, the prescribed distance, and the prescribed number of times. In the case of a combination of the above conditions, the conditions constituting the combination are set as appropriate so that the judgment criterion for arousing attention of the driver is kept different than in the ordinary situation until, for example, all of these conditions or one of these conditions is satisfied.

Occurrence of mode confusion as described above can be prevented in the above manner. That is, the driver can easily recognize that the self vehicle is running at level-2 because the situation is different than in the ordinary situation. As a result, the driver can drive by making judgments and manipulations to avoid leaving the current running lane in the situation shown in FIG. 1B or to prevent the self vehicle 42 from coming too close to the other vehicle 47 in the situation shown in FIG. 2C.

<Example Configuration of Vehicular System>

Figure 3:
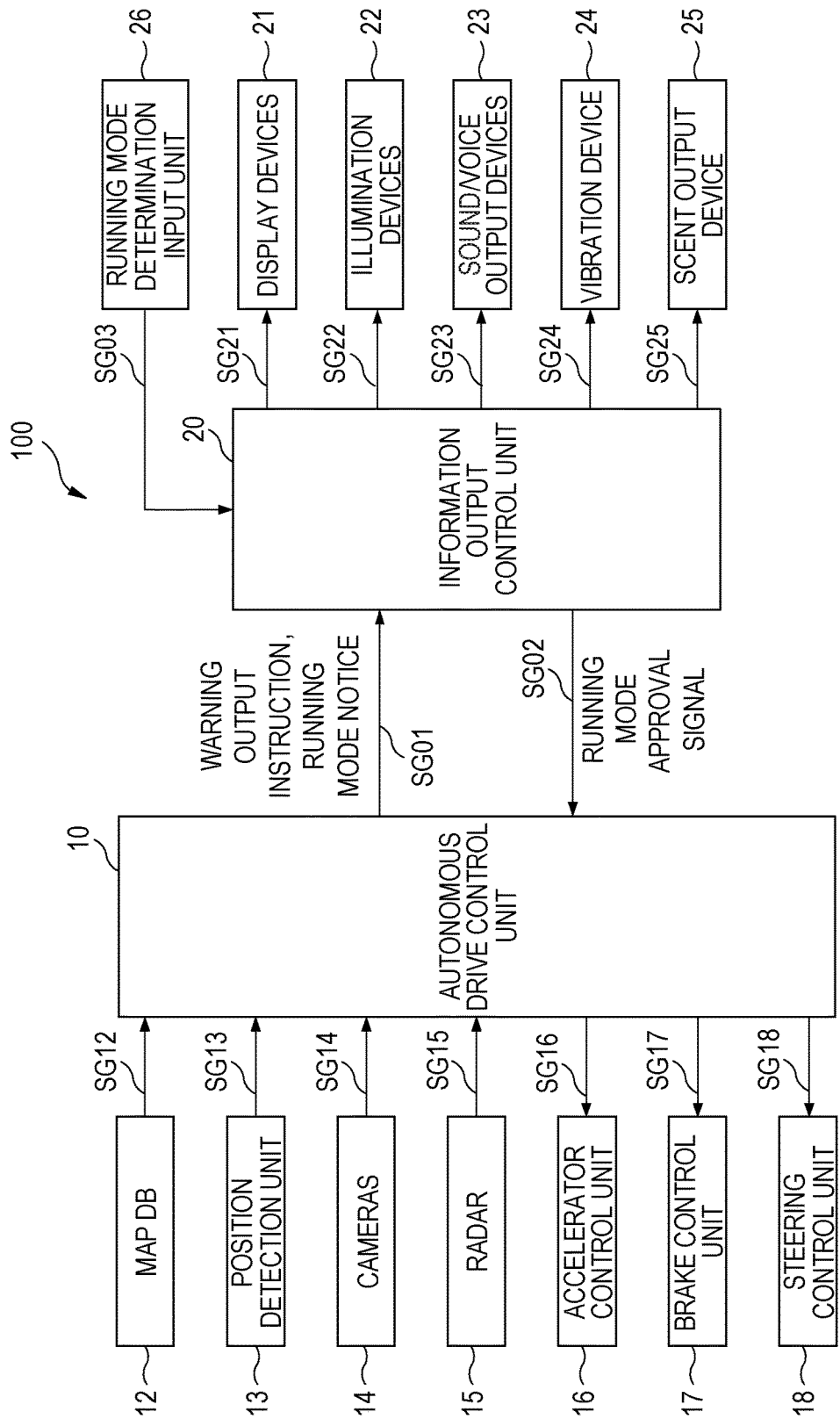
FIG. 3 is a block diagram showing an example configuration of a main part of a vehicular system as an implementation of the present invention.

FIG. 3 shows an example configuration of a main part of a vehicular system that performs the method for conveying information during an autonomous drive according to the embodiment of the invention. This vehicular system includes functions for driving an automobile autonomously and the vehicular information presenting device 100 which presents information relating to an autonomous drive to the driver.

The vehicular system shown FIG. 3 is equipped with, as constituent elements necessary to drive the automobile autonomously and elements necessary to generate an alarm output instruction, an autonomous drive control unit 10, a road map database (DB) 12, a position detection unit 13, vehicular cameras 14, a radar 15, an accelerator control unit 16, a brake control unit 17, and a steering control unit 18.

A wide-range road map including the road on which the self vehicle is running currently and various kinds of information relating to the roads are accumulated in advance and held in the road map database 12. Information, such as map data, held by the road map database 12 is input to the autonomous drive control unit 10 as input information SG12.

The position detection unit 13 can calculate latest position information indicating a current position of the self vehicle by receiving and using radio waves coming from, for example, GPS (global positioning system) satellites. This position information is input to the autonomous drive control unit 10 as input information SG13.

The vehicular cameras 14 can take videos representing situations around (e.g., ahead of, behind, and beside) the self vehicle and output resulting video signals. The video signals are input to the autonomous drive control unit 10 as input information SG14.

The radar 15 can detect presence/absence of an obstacle such as the vehicle running immediately ahead, an intervehicle distance between the vehicle immediately ahead and the self vehicle, and other information by a detecting function utilizing radio waves such as millimeter waves. Information detected by the radar 15 is input to the autonomous drive control unit 10 as input information SG15.

The accelerator control unit 16 is equipped with an actuator that is necessary to adjust the accelerator position of the self vehicle automatically and can be controlled electrically. The accelerator control unit 16 can adjust the accelerator position according to an output signal SG16 that is output from the autonomous drive control unit 10.

The brake control unit 17 is equipped with actuators that are connected to brake mechanisms of the self vehicle and can be controlled electrically. The brake control unit 17 can control turning-on/off of the brakes of the self vehicle and the degrees of their braking according to an output signal SG17 that is output from the autonomous drive control unit 10.

The steering control unit 18 is equipped with an actuator that is connected to a steering mechanism of the self vehicle and can be controlled electrically. The steering control unit 18 can move the steering mechanism of the self vehicle or generate assist torque for assisting steering force of the driver according to an output signal SG18 that is output from the autonomous drive control unit 10.

The autonomous drive control unit 10 is an electronic control unit (ECU) for performing an autonomous drive control on an automobile and is provided with functions for performing autonomous driving of, for example, level-2 (LV2) or level-3 (LV3) among prescribed automation levels.

The autonomous drive control unit 10 can perform an acceleration control on the self vehicle by instructing the accelerator control unit 16 using an output signal SG16. The autonomous drive control unit 10 can perform a braking control on the self vehicle by instructing the brake control unit 17 using an output signal SG17. Furthermore, the autonomous drive control unit 10 can perform a steering control on the self vehicle by instructing the steering control unit 18 using an output signal SG18.

By analyzing videos of the vehicular cameras 14, the autonomous drive control unit 10 can recognize white lines at the boundaries between running lanes and a position of the self vehicle in the left-right direction and thereby calculate a proper position of the self vehicle in the left-right direction and recognize, for example, how a road ahead is curved. In this manner, the autonomous drive control unit 10 can realize a lane keeping assist function of performing an automatic control so that, for example, the self vehicle runs at the center of a running lane of a road.

The autonomous drive control unit 10 can perform acceleration and deceleration automatically on the basis of results of analysis of videos taken by the vehicular cameras 14 and position information and distance information of the vehicle immediately ahead detected by the radar 15 so that, for example, the intervehicle distance between the vehicle immediately ahead and the self vehicle is kept within a safe range. That is, ACC can be realized.

The autonomous drive control unit 10 is provided with a function of generating a warning output instruction for a warning about deviation from a running lane by comparing a position of the self vehicle in the left-right direction with running lane reference positions of the road and a function of generating a warning output instruction when detecting an abnormal approach of another vehicle by monitoring the distances between the self vehicle and vehicles around it.

The autonomous drive control unit 10 can output a running mode notice indicating whether the current autonomous drive mode is of level-3 or level-2 and serving as a handover request for a transition from level-3 to level-2. The above-mentioned warning output instruction and the running mode notice are output from the autonomous drive control unit 10 as an instruction signal SG01 shown in FIG. 3. When having issued a handover request in the form of an instruction signal SG01, the autonomous drive control unit 10 makes a transition to level-2 after confirming reception of a running mode approval signal SG02 indicating approval of the driver.

The autonomous drive control unit 10 can calculate a proper running route the self vehicle should take and predict a variation of a road ahead such as occurrence of a curve on the basis of a target place determined in advance, a current position detected by the position detection unit 13, a road map of the road map database 12, and other information. The accuracy of prediction can be increased by causing it to reflect analysis results of actual videos taken by the vehicular cameras 14.

In the level-3 autonomous drive mode, the autonomous drive control unit 10 can perform acceleration, deceleration, and steering controls properly according to an actual road situation and a situation of other vehicles around the self vehicle. For example, since a road shape etc. can be recognized in advance on the basis of map data, to drive along a sharply curved road safely, the autonomous drive control unit 10 generates output signals SG16, SG17, and SG18 so that the self vehicle is decelerated sufficiently before entering that portion of the road and can run approximately at the center of a running lane by performing proper steering according to the shape of the running lane.

On the other hand, while the self vehicle is running at level-2 using, for example, the lane keeping assist function, the autonomous drive control unit 10 performs auxiliary automatic steering so that the self vehicle runs approximately at the center of a running lane. Thus, to drive along, for example, a sharply curved road safely, steering by the driver is necessary to secure safety. While the self vehicle is running at level-2 using, for example, the ACC function, although acceleration and deceleration are automatically performed by the autonomous drive control unit 10 so that the intervehicle distance between the self vehicle and the vehicle immediately ahead is kept in a safe range, a braking manipulation by the driver needs to be performed in certain situations to secure safety.

An information output control unit 20 is an electronic control unit (ECU) that performs a control for presenting information necessary during an autonomous drive to the driver. The autonomous drive control unit 10 and the information output control unit 20 which are shown in FIG. 3 may be integrated together.

The vehicular information presenting device 100 according to the embodiment consists of part of the functions of the autonomous drive control unit 10 and at least one of the information output control unit 20, display devices 21, illumination devices 22, sound/voice output devices 23, a vibration device 24, and a scent output device 25.

The display devices 21 are display devices such as a meter unit and a center display that are installed in the vehicle at such locations as to be able to be visually recognized easily by the driver who is driving the vehicle at the driver seat.

The illumination devices 22 are various illumination devices installed in the vehicle. The sound/voice output devices 23 are various auditory output devices including an audio device. The vibration device 24 is a device capable of generating mechanical vibration by an electrical control. So that the driver can recognize vibration as a tactile sensation or the like during a drive, the vibration device 24 is attached or connected to a sitting portion of the driver seat or the steering wheel.

The scent output device 25 is a device capable of generating a particular scent in the vehicle compartment by an electrical control. The scent output device 25 is installed inside a vehicle air conditioner, for example, and can spray an aromatic and diffuse its scent in the inside space of the vehicle compartment through ventilation.

A running mode determination input unit 26 serves to detect an approval manipulation of the driver for a handover request from the system. For example, if the driver grips the steering wheel in response to issuance of a handover request, the running mode determination input unit 26 detects it as an approval manipulation and generates an input signal SG03.

When detecting a handover request through an instruction signal SG01 that is output from the autonomous drive control unit 10, the information output control unit 20 notifies the driver of it using, for example, the display devices 21 and/or the sound/voice output devices 23. If an input signal SG03 is generated by the information output control unit 20 in response to an approval manipulation by the driver, the information output control unit 20 outputs a running mode approval signal SG02. By receiving the running mode approval signal SG02, the autonomous drive control unit 10 can cause a drive mode level transition from level-3 to level-2.

When receiving, for example, a warning output instruction for a warning about deviation from a running lane as an instruction signal SG01 from the autonomous drive control unit 10, the information output control unit 20 present necessary information to the driver by selecting one or a combination of the display devices 21, the illumination devices 22, the sound/voice output devices 23, the vibration device 24, and the scent output device 25 according to the received warning output signal. The information output control unit 20 can present information in various forms and adjusts the intensity of information presentation by using a proper one(s) of the various kinds of devices as needed.

<Example Process of Vehicular System>

FIG. 4 shows an example process characteristic of the vehicular system which performs the method for conveying information during an autonomous drive according to the invention. That is, the process characteristic of the invention is realized as a result of execution of an information presentation control shown in FIG. 4 by the autonomous drive control unit 10 and the information output control unit 20 shown in FIG. 3 which constitute the vehicular information presenting device 100. The example process shown in FIG. 4 will be described below.

At step S11, when the drive mode level of the self vehicle was switched from level-3 to level-2, the autonomous drive control unit 10 recognizes an elapsed time from the switching and judges whether the elapsed time is within a prescribed time determined in advance. As for the prescribed time, a typical mode is that the driver selects from 5 minutes, 15 minutes, 30 minutes, etc. Although in FIG. 4 the elapsed time is used to define the judgment condition in the autonomous drive control unit 10, the judgment condition employed at step S11 may be one other than the prescribed time, such as a prescribed distance.

If the elapsed time from the switching of the drive mode level of the self vehicle from level-3 to level-2 is within the prescribed time, to make the frequency of arousing attention of the driver higher than in an ordinary situation, at step S12 the autonomous drive control unit 10 selects a special judgment criterion (i.e., a judgment criterion according to which a warning tends to be issued more easily than according to an ordinary one) as a new judgment criterion for judging whether to issue a warning for arousing attention of the driver. If the elapsed time is longer than the prescribed time, at step S12B the autonomous drive control unit 10 selects an ordinary judgment criterion as a judgment criterion for judging whether to issue a warning for arousing attention of the driver.

At step S13, the autonomous drive control unit 10 monitors the drive state of the self vehicle all the time and generates an attention-arousing event according to a result of comparison between the drive state of the self vehicle and the judgment criterion selected at step S12 or S12B. For example, the autonomous drive control unit 10 can generate an attention-arousing event indicating a deviation from a running lane that is about to occur by comparing the positions of the left and right ends of the self vehicle with reference positions, in the left-right direction, of the running lane along which the self vehicle is running currently. Based on the generated attention-arousing event, the autonomous drive control unit 10 outputs a warning output instruction as an instruction signal SG01.

Monitoring the instruction signal SG01 it receives, at step S14 the information output control unit 20 judges whether an attention-arousing event has occurred. The information output control unit 20 moves to step S15 if an attention-arousing event has occurred.

At step S15, the information output control unit 20 judges whether the elapsed time from the drive mode level switching from level-3 to level-2 is within the prescribed time, that is, whether the stricter judgment criterion that was selected at step S12 (according to which a warning tends to be issued more easily) is still employed as the judgment criterion for judging whether to issue a warning for arousing attention of the driver. The information output control unit 20 moves to step S16 or S17 according to a result of the judgment.

At step S16, the information output control unit 20 presents information corresponding to the type of the generated attention-arousing event in the form of a sound or a display (ordinary output mode). Likewise, at step S17, the information output control unit 20 presents information corresponding to the type of the generated attention-arousing event (high-frequency output mode) similarly to S16. The information output control unit 20 presents information in different forms of expression at steps S16 and S17.

If detecting at step S18 that the attention-arousing event has finished on the basis of the instruction signal SG01, at step S19 the information output control unit 20 finishes the information presentation that was started at step S16 or S17 and returns the manner of sound emission or display to the ordinary manner.

Specific Example-1 of Attention-Arousing Operation

Figure 5B:
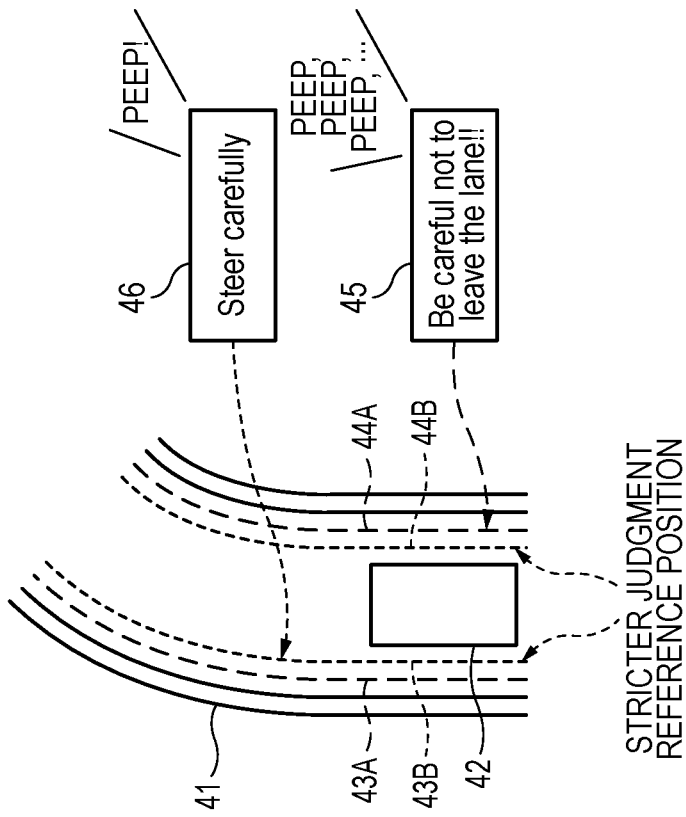
FIGS. 5A and 5B are plan views showing example relationships between the self vehicle and reference positions, in the left-right direction, of a running lane of a road.
Figure 5A:
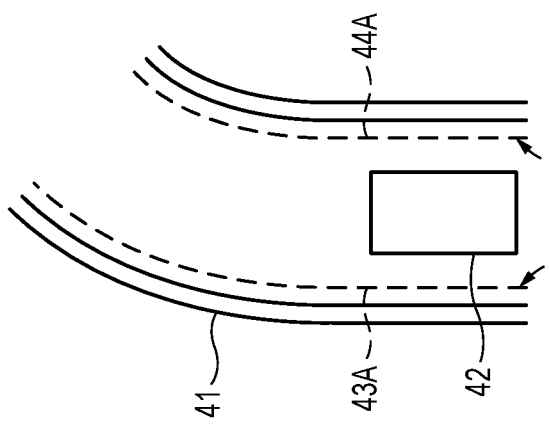

FIGS. 5A and 5B show example relationships between the self vehicle and reference positions, in the left-right direction, of a running lane of a road.

When a self vehicle 42 runs on a road 41 in the level-2 (LV2) drive mode as shown in FIG. 5A, whether the self vehicle 42 is leaving a running lane can be detected by monitoring the position of the self vehicle 42 in the left-right direction.

In the example shown in FIG. 5A, a running lane left-end reference position 43A and a running lane right-end reference position 44A are set in advance as judgment references in the vicinities of the left end and the right end of the running lane of the road 41, respectively. Whether the self vehicle 42 is leaving the running lane can be detected by comparing the positions of the left and right end of the vehicle body, for example, of the self vehicle 42 with the running lane left-end reference position 43A and the running lane right-end reference position 44A.

On the other hand, in the example shown in FIG. 5B, a running lane left-end reference position 43B is set inside the running lane left-end reference position 43A and a running lane right-end reference position 44B is set inside the running lane right-end reference position 44A. Where the running lane left-end reference position 43B and the running lane right-end reference position 44B are used as judgment references instead of the running lane left-end reference position 43A and the running lane right-end reference position 44A, the judgment criterion is made stricter and hence an attention-arousing event for deviation from the running lane is generated more easily (the frequency of generation is made higher) than according to the ordinary judgment criterion.

If the running lane left-end reference position 43A and the running lane right-end reference position 44A are used as judgment references at step S12B shown in FIG. 4 in judging whether the self vehicle 42 is leaving the running lane, the frequency of generation of attention-arousing events becomes an ordinary value. On the other hand, if the running lane left-end reference position 43B and the running lane right-end reference position 44B are used as judgment references at step S12 shown in FIG. 4 in judging whether the self vehicle 42 is leaving the running lane, the frequency of generation of attention-arousing events becomes higher than the ordinary value.

In the example of FIG. 5B, if the left end or the right end of the self vehicle 42 crosses the running lane left-end reference position 43A or the running lane right-end reference position 44A outward, a warning message 45 is presented to the driver. If the left end or the right end of the self vehicle 42 crosses the running lane left-end reference position 43B or the running lane right-end reference position 44B outward, a warning message 46 is presented to the driver.

As shown in FIG. 5B, the warning messages 45 and 46 are different from each other and presented in different forms. That is, when the running lane left-end reference position 43A and the running lane right-end reference position 44A are used as judgment references, the warning message 45 is presented at step S16 shown in FIG. 4. When the running lane left-end reference position 43B and the running lane right-end reference position 44B are used as judgment references, the warning message 46 is presented at step S17 shown in FIG. 4.

As a result, until a lapse of the prescribed time from switching to the level-2 drive mode, the driver can realize that warnings indicating deviation from a running lane are being generated at a higher frequency than in an ordinary situation and the output form of the warning message 46 is different than in the ordinary situation.

Specific Example-2 of Attention-Arousing Operation

Figure 6A:
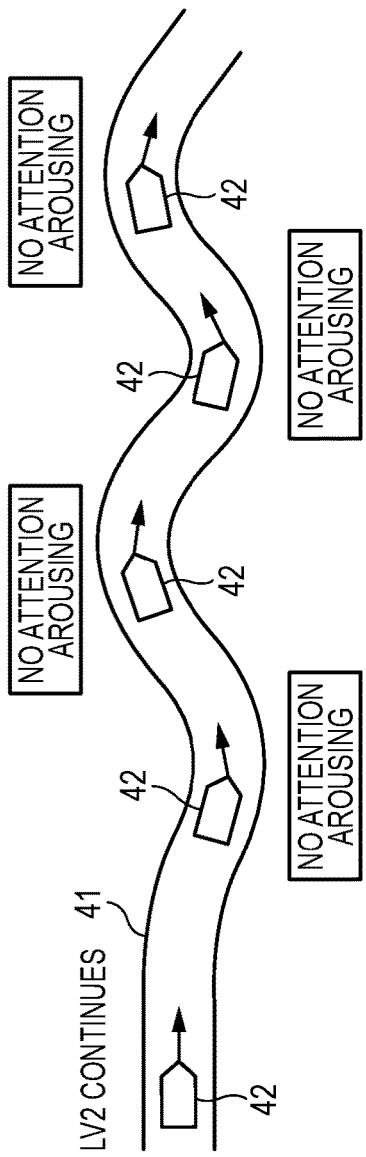
FIGS. 6A and 6B are plan views showing example relationships between a curved road and attention-arousing events generated in the self vehicle.
Figure 6B:
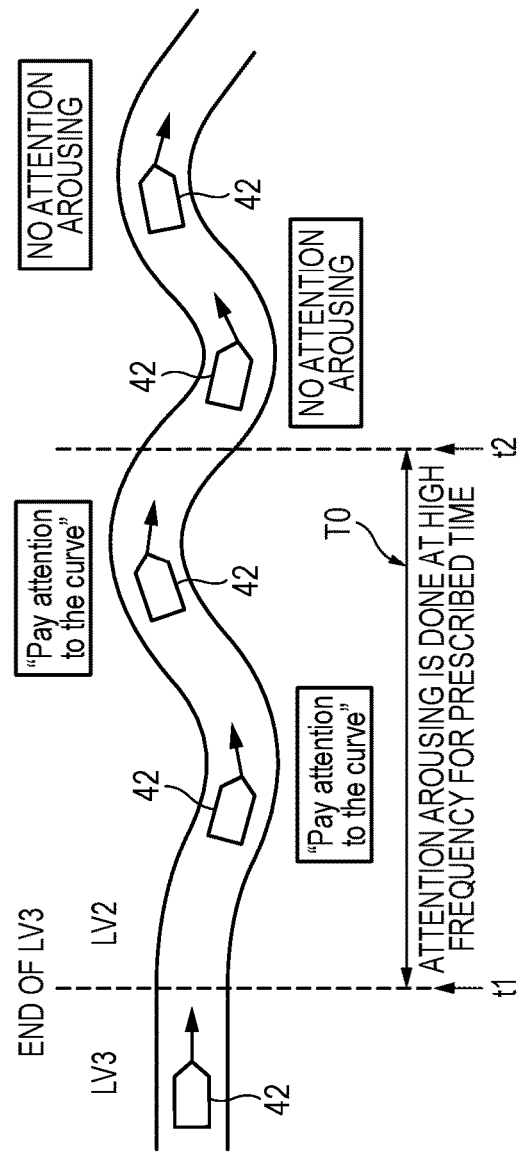

FIGS. 6A and 6B show example relationships between a curved road and attention-arousing events generated in the self vehicle.

The example shown in FIG. 6A assumes a case that a self vehicle 42 continues to run on a curved road in the level-2 (LV2) drive mode. In this case, since the ordinary judgment criterion is always selected at step S12B shown in FIG. 4, the frequency of generation of warnings of deviation from a running lane is made an ordinary value. Thus, as shown in FIG. 6A, no attention-arousing event for deviation from a running lane is generated at any curving point of the road.

On the other hand, the example shown in FIG. 6B assumes a case that the self vehicle 42 runs in the level-3 (LV3) drive mode until time t1, switching is made to the level-2 (LV2) drive mode at time t1 through a handover, and the self vehicle 42 thereafter runs in the level-2 drive mode.

Thus, until time t2 which is later than time t1 by a prescribed time T0, a special judgment criterion (e.g., the running lane left-end reference position 43B and the running lane right-end reference position 44B shown in FIG. 5B) is selected at step S12 shown in FIG. 4.

As a result, in the example shown in FIG. 6B, an attention-arousing event for presenting "Pay attention to the curve" tends to be generated easily from time t1 to time t2. After time t2, since the ordinary judgment criterion is restored through execution of step S12B shown in FIG. 4, likewise the frequency of generation of attention-arousing events returns to the ordinary value.

<Adjustment of Prescribed Time>

Figure 7:
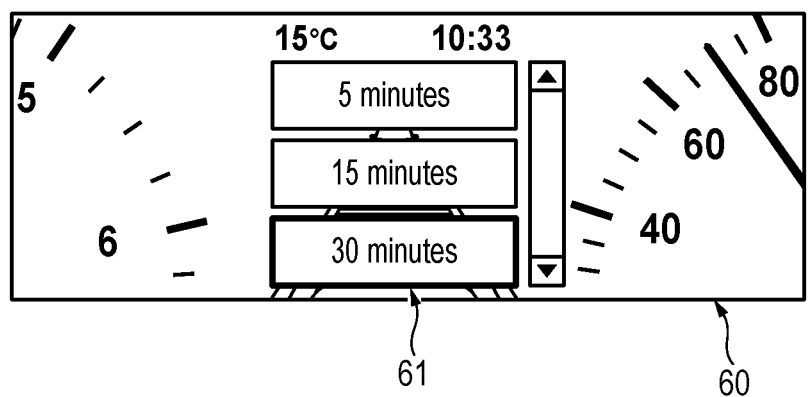
FIG. 7 is a front view showing an example time selection menu displayed on a meter display panel.

FIG. 7 shows an example of a time selection menu 61 displayed on a meter display panel 60. As for a typical method for selecting a prescribed time that is referred to at step S11 of the information presentation control shown in FIG. 4, a proper value is selected by a user of the self vehicle as needed in, for example, a state that the self vehicle is stopped.

In the example shown in FIG. 7, the time selection menu 61 displayed on the meter display panel 60 has options "5 minutes," "15 minutes," and "30 minutes." That is, a user, for example, can select a desired prescribed time by performing a manipulation on the time selection menu 61. It is also conceivable to add the following options (1) and (2) in the time selection menu 61 to allow the user to select one of them instead of a prescribed time:

(1) the frequency of arousing attention of the driver is kept high until turning-off of the engine; and (2) the frequency of arousing attention of the driver is kept high until the driver manipulates the steering wheel for the first time.

Specific Example-3 of Attention-Arousing Operation

Figure 8:
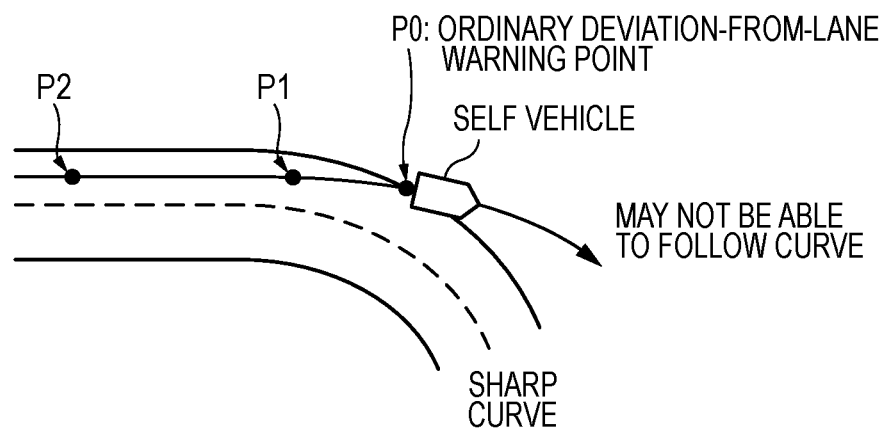
FIG. 8 shows an example relationship between a sharp curve of a road and a vehicle running course and a deviation-from-lane warning point.

FIG. 8 shows an example relationship between a sharp curve of a road, a vehicle running course, and a deviation-from-lane warning point. The example shown in FIG. 8 assumes a case that the vehicle running in the level-2 (LV2) drive mode has reached a sharp curve road.

If the ordinary judgment criterion is selected at step S12B shown in FIG. 4 in arousing attention of the user by generating a warning about deviation from a running lane of the self vehicle, the vehicular information presenting device 100 arouses attention of the user by a warning about deviation from a running lane at an ordinary deviation-from-lane warning point P0 shown in FIG. 8. Thus, even if the driver makes a drive manipulation after recognizing this warning, the drive manipulation may be too late to avoid deviation from the running lane.

On the other hand, if the stricter judgment criterion is selected at step S12 shown in FIG. 4, the vehicular information presenting device 100 can arouse attention of the user by a warning about deviation from a running lane at an early deviation-from-lane warning point P1 or P2 that is short of the ordinary deviation-from-lane warning point P0. As a result, the driver can start steering and deceleration manipulations manually in response to the warning before the self vehicle reaches the sharp curve and thereby pass it safely.

Specific Example-1 of Attention-Arousing Expression Form

Figures 9A, 9B:
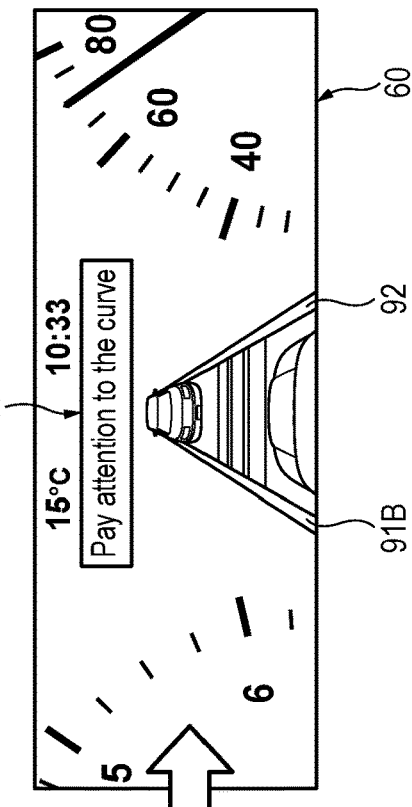
FIGS. 9A and 9B show specific example displays that are made on the meter display panel to arouse attention of the driver.

FIGS. 9A and 9B show specific example displays that are made on the meter display panel 60 to arouse attention of the driver.

The display example shown in FIG. 9A assumes that the self vehicle is running in the level-2 drive mode without leaving a running lane, and hence no display as a deviation-from-lane warning is made therein. Running lane keeping lines 91 and 92 displayed on the meter display panel 60 shown in FIG. 9A correspond to white lines on an actual road that can be recognized visually by the driver, and represent the left and right ends of the running lane.

On the other hand, the display example shown in FIG. 9B assumes a case that the self vehicle is running in the level-2 drive mode, an attention-arousing event for a deviation-from-lane warning is generated according to the stricter judgment criterion selected at step S12 shown in FIG. 4, and attention-arousing information is displayed at step S17.

More specifically, the example shown in FIG. 9B assumes a case that the left end of the self vehicle has crossed a running lane left-end reference position 43B outward, an attention-arousing line 91B is displayed in place of the running lane keeping line 91. The attention-arousing line 91B is displayed in a different display color than the running lane keeping line 91 and is turned on and off. Furthermore, in the example shown in FIG. 9B, an attention-arousing display 93 including a message "Pay attention to the curve" and an attention-arousing sound are added.

That is, in the example shown in FIG. 9B, attention-arousing information is presented in a different form than in an ordinary situation because of execution of step S17 at least until a lapse of the prescribed time from a transition from the level-3 drive mode to the level-2 drive mode through a handover. Because of not only the difference in the frequency of arousing attention of the driver but also the difference in the attention-arousing expression form, the driver can easily recognize that a transition to level-2 has already been made.

Specific Example-2 of Attention-Arousing Expression Form

Figure 10:
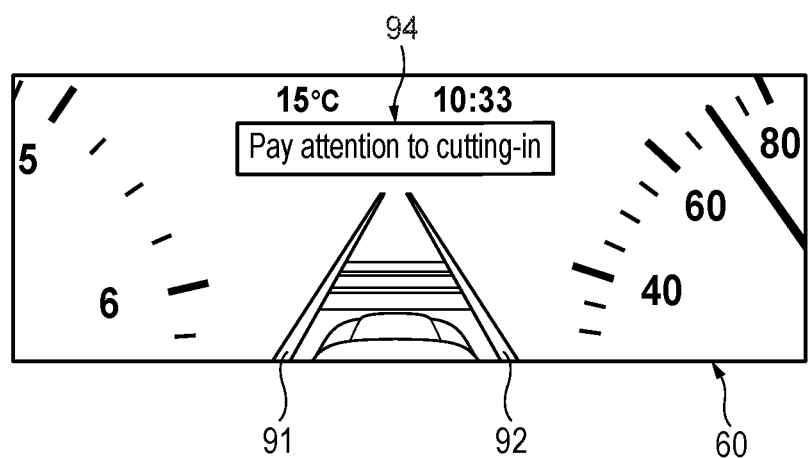
FIG. 10 shows another specific display example on the meter display panel.

FIG. 10 shows another specific example display that is made on the meter display panel 60 to arouse attention of the driver.

The example shown in FIG. 10 assumes a situation that a drive mode level transition has been made from level-3 to level-2 in the self vehicle 42 as a result of, for example, a change from the traffic state shown in FIG. 2A to that shown in FIG. 2B. In this case, since the frequency of arousing attention of the driver can be increased by making the judgment criterion stricter at step S12, in the state of FIG. 2B the vehicular information presenting device 100 can generate an attention-arousing event to display an attention-arousing message 94 "Pay attention to cutting-in" on the meter display panel 60 and to output an attention-arousing sound.

Thus, looking at the presented attention-arousing message 94, the driver of the self vehicle 42 being in the state of FIG. 2B can recognize that a transition has been made to level-2 and predict occurrence of possible cutting-in of another vehicle as shown in FIG. 2C. As a result, occurrence of mode confusion can be avoided and safety can be secured.

Features of the above-described method for conveying information during an autonomous drive and vehicular information presenting device according to the embodiment of the invention will be summarized below concisely in the form of items [1] to [10]:

[1] A method for conveying information during an autonomous drive which presents information to a driver in a vehicle having, as running states, two or more states that are different from each other in the degree of involvement of the driver in drive control, wherein:

the running states include a first state in which the drive control is performed automatically and a second state that is higher in the degree of involvement of the driver in drive control than the first state;

when switching is made from the first state to the second state, the frequency of arousing attention of the driver is increased by changing a judgment criterion for detecting an event that necessitates arousing attention of the driver until a prescribed condition is satisfied (S11, S12); and when the event is detected, attention-arousing information is conveyed to the driver using an output device that stimulates at least one of the five senses of the driver (S17).

[2] The method for conveying information during an autonomous drive according to item [1], wherein the output form of the attention-arousing information that is conveyed to the driver upon detection of the event is switched between a first output form to be employed before the frequency of arousing attention of the driver is increased and a second output form to be employed after the frequency of arousing attention of the driver is increased (S15, S16, S17).

[3] The method for conveying information during an autonomous drive according to item [2], wherein the attention-arousing information is conveyed to the driver with earlier timing (early deviation-from-lane warning point P1, P2; see FIG. 8) in the second output form than in the first output form (ordinary deviation-from-lane warning point P0).

[4] The method for conveying information during an autonomous drive according to item [2], wherein the second output form is such that an explicit message (attention-arousing message 93, 94) is output in addition to attention-arousing information that is output in the first output form.

[5] The method for conveying information during an autonomous drive according to item [2], wherein attention-arousing information that is output in the second output form is an emphasized version of attention-arousing information that is output in the first output form.

[6] The method for conveying information during an autonomous drive according to item [1], wherein:

the first state is a state in which a running direction and speed of the self vehicle are controlled automatically and no assistance of the driver to the drive control is necessary; and the second state is a state in which a running direction and speed of the self vehicle are controlled automatically but assistance of the driver to the drive control is required.

[7] The vehicular information presenting device according to item [1], wherein:

the first state is a state in which a running speed and direction of the vehicle are controlled automatically; and the second state is a state in which at least one of the running speed and the running direction of the vehicle is controlled by the driver.

[8] A vehicular information presenting device (100) for presenting information to a driver in a vehicle having, as running states, two or more states that are different from each other in the degree of involvement of the driver in drive control, wherein:

the running states include a first state in which the drive control is performed automatically and a second state that is higher in the degree of involvement of the driver in drive control than the first state; and the vehicular information presenting device comprises an information output control unit (20) which outputs information relating to an event that necessitates arousing of attention of the driver, the vehicular information presenting device increasing the frequency of arousing attention of the driver by changing a judgment criterion for detecting an event that necessitates arousing attention of the driver until a prescribed condition is satisfied, when switching is made from the first state to the second state; and conveying attention-arousing information to the driver using an output device that stimulates at least one of the five senses of the driver, when the event is detected.

[9] The vehicular information presenting device according to item [8], wherein:

the first state is a state in which a running speed and direction of the vehicle are controlled automatically and no assistance of the driver to the drive control is necessary; and the second state is a state in which the running speed and direction of the vehicle are controlled automatically but assistance of the driver to the drive control is required.

[10] The vehicular information presenting device according to item [8], wherein:

the first state is a state in which a running speed and direction of the vehicle are controlled automatically; and the second state is a state in which at least one of the running speed and the running direction of the vehicle is controlled by the driver.

What is claimed is:

1. A method for conveying information during an autonomous drive which presents information to a driver in a vehicle having, as running states, two or more states that are different from each other in the degree of involvement of the driver in drive control, wherein:

the running states include a first state in which the drive control is performed automatically and a second state that is higher in the degree of involvement of the driver in drive control than the first state;

when switching is made from the first state to the second state, the frequency of arousing attention of the driver is increased by changing a judgment criterion for detecting an event that necessitates arousing attention of the driver until a prescribed condition is satisfied; and when the event is detected, attention-arousing information is conveyed to the driver using an output device that stimulates at least one of the five senses of the driver.

2. The method for conveying information during an autonomous drive according to claim 1, wherein the output form of the attention-arousing information that is conveyed to the driver upon detection of the event is switched between a first output form to be employed before the frequency of arousing attention of the driver is increased and a second output form to be employed after the frequency of arousing attention of the driver is increased.

3. The method for conveying information during an autonomous drive according to claim 2, wherein the attention-arousing information is conveyed to the driver with earlier timing in the second output form than in the first output form.

4. The method for conveying information during an autonomous drive according to claim 2, wherein the second output form is such that an explicit message is output in addition to attention-arousing information that is output in the first output form.

5. The method for conveying information during an autonomous drive according to claim 2, wherein attention-arousing information that is output in the second output form is an emphasized version of attention-arousing information that is output in the first output form.

6. A vehicular information presenting device for presenting information to a driver in a vehicle having, as running states, two or more states that are different from each other in the degree of involvement of the driver in drive control, wherein:

the running states include a first state in which the drive control is performed automatically and a second state that is higher in the degree of involvement of the driver in drive control than the first state; and the vehicular information presenting device comprises an information output control unit which outputs information relating to an event that necessitates arousing of attention of the driver, the vehicular information presenting device increasing the frequency of arousing attention of the driver by changing a judgment criterion for detecting an event that necessitates arousing attention of the driver until a prescribed condition is satisfied, when switching is made from the first state to the second state; and conveying attention-arousing information to the driver using an output device that stimulates at least one of the five senses of the driver, when the event is detected.

* * * * *